United States Patent
Tanaka (10) Patent No.: US 10,812,192 B2
(45) Date of Patent: Oct. 20, 2020

(54) OPTICAL TRANSCEIVER

(71) Applicant: SUMITOMO ELECTRIC INDUSTRIES, LTD., Osaka (JP)

(72) Inventor: Yasuhiro Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/689,779

(22) Filed: Nov. 20, 2019

(65) Prior Publication Data

US 2020/0162164 A1 May 21, 2020

(30) Foreign Application Priority Data

Nov. 21, 2018 (JP) .................................. 2018-218234

(51) Int. Cl.
 *H04B 10/00* (2013.01)
 *H04B 10/40* (2013.01)
 *G02B 6/36* (2006.01)

(52) U.S. Cl.
 CPC ............... *H04B 10/40* (2013.01); *G02B 6/36* (2013.01)

(58) Field of Classification Search
 CPC ................ H04B 10/40; H04B 10/0795; H04B 10/07955; H04B 10/0779; G02B 6/36; G02B 6/4246; G02B 6/4292; G02B 6/4263; G02B 6/4274
 USPC ....... 398/135, 136, 137, 138, 139, 158, 159, 398/164, 33, 38, 22, 23, 24, 25; 385/88, 385/89, 90, 92, 93
 See application file for complete search history.

(56) References Cited

U.S. PATENT DOCUMENTS

| | | | | |
|---|---|---|---|---|
| 6,941,077 B2 * | 9/2005 | Aronson | ................ | G01M 11/00 398/137 |
| 7,912,375 B2 * | 3/2011 | Kondo | ................... | H04B 10/40 398/135 |
| 9,819,416 B2 * | 11/2017 | Elahmadi | ................ | H04L 1/004 |

FOREIGN PATENT DOCUMENTS

| | | |
|---|---|---|
| JP | 2013-187714 | 9/2013 |
| JP | 2013-236181 | 11/2013 |

* cited by examiner

*Primary Examiner* — Hanh Phan
(74) *Attorney, Agent, or Firm* — Smith, Gambrell & Russell, LLP.

(57) ABSTRACT

A hot-pluggable optical transceiver capable of being inserted into an apparatus is equipped with an optical reception circuit; an optical transmission circuit; a signal processing circuit; a nonvolatile memory; a control unit controlling each of the portions of the transceiver; an insertion detection terminal; a reset terminal; and an alarm terminal. When the insertion detection terminal has a voltage that is smaller than a predetermined value, the control unit is allowed to receive the reset signal from the apparatus through the reset terminal. When the insertion detection terminal has a voltage that is larger than the predetermined value, the control unit is allowed to load new software by receiving a clock signal from the apparatus through the reset terminal and receiving a data signal synchronized with the clock signal from the apparatus through the alarm terminal and to store the new software in the nonvolatile memory.

4 Claims, 7 Drawing Sheets

OPTICAL TRANSCEIVER

CROSS-REFERENCE TO RELATED APPLICATION

This application claims priority from Japanese Patent Application No. 2018-218234, filed on Nov. 21, 2018, the entire subject matter of which is incorporated herein by reference.

TECHNICAL FIELD

The present disclosure relates to an optical transceiver, for example, an optical transceiver used in an optical communication system.

BACKGROUND

An optical transceiver is used being inserted in an apparatus (host apparatus) that is part of an optical communication system. In a state that the optical transceiver is inserted in the host apparatus, a portion of the exterior of the optical transceiver is exposed from the host apparatus to its outside. An optical connector that is attached to the tip of an optical fiber cable can be connected to the exposed portion of the exterior of the optical transceiver from outside.

The optical transceiver converts an electrical signal received from the host apparatus into an optical signal and transmitting the optical signal to one optical fiber cable. And the optical transceiver converts an optical signal received from another optical fiber into an electrical signal and outputs the electrical signal to the host apparatus. In this manner, the optical transceiver can perform a two-core bidirectional communication using two optical fiber cables.

Being a kind of embedded system, optical transceivers incorporate a controller (processor) such as a microcomputer. It is known to acquire programs to be installed in the controller of an optical transceiver from the outside via special terminals (refer to JP-A-2013-187714 and JP-A-2013-236181, for example).

SUMMARY

With the increase in the transmission rate and capacity of optical communication systems, to increase the transmission rate, optical transceivers are now required to incorporate a signal processing circuit such as a signal processing IC (integrated circuit). Programs dedicated to the signal processing IC are stored in a dedicated memory that is a different component than the signal processing IC, and are installed in the signal processing IC from the dedicated memory when the optical transceiver is powered on.

A nonvolatile memory is used as the dedicated memory. Not having a nonvolatile memory, the signal processing IC reads the dedicated programs from the dedicated memory and performs a prescribed signal processing operation every time the optical transceiver is powered on. To rewrite the dedicated programs after shipment of the optical transceiver from a factory to modify a function of the signal processing IC or add a new function to it, it is necessary to write programs to the internal dedicated memory from outside the optical transceiver.

However, the functions and arrangement of terminals that are provided in an electrical connector for connecting an optical transceiver to a host apparatus are prescribed in a related industry standard such as MSA (Multi-Source Agreement). However, in such a standard, no terminal for writing dedicated programs to the dedicated memory is provided. It is therefore difficult to write dedicated programs to the dedicated memory at high speed.

An embodiment of the present disclosure provides a hot-pluggable optical transceiver capable of being inserted into an apparatus, the hot-pluggable optical transceiver comprising an optical reception circuit configured to convert an optical incoming signal to an electrical incoming signal for receiving; an optical transmission circuit configured to convert an electrical outgoing signal to an optical outgoing signal for transmitting; a signal processing circuit configured to load software when the signal processing circuit is activated by powering up the optical transceiver, and to process the electrical incoming signal and the electrical outgoing signal according to the software; a nonvolatile memory storing the software; a control unit controlling at least one of the optical reception circuit, the optical transmission circuit, and the signal processing circuit; an insertion detection terminal allowing the apparatus to detect that the hot-pluggable optical transceiver is inserted in the apparatus; a reset terminal for receiving a reset signal from the apparatus; and an alarm terminal for sending an alarm signal to the apparatus, wherein the control unit is allowed to receive the reset signal from the apparatus through the reset terminal when the insertion detection terminal has a voltage that is smaller than a predetermined value; and the control unit is allowed to load new software by receiving a clock signal from the apparatus through the reset terminal through the reset terminal and receiving a data signal synchronized with the clock signal from the apparatus through the alarm terminal and to store the new software in the nonvolatile memory when the insertion detection terminal has a voltage that is larger than the predetermined value.

DETAILED DESCRIPTION

[Embodiment]

A specific example optical transceiver 100 according to an embodiment of the present invention will be hereinafter described with reference to the drawings. In the following description, the same or equivalent elements are given the same reference symbol and will not be described redundantly. The invention is not limited to the embodiment described below and various modifications can be made in every aspect without departing from the spirit and scope of the claims and their equivalents.

The optical transceiver 100 according to the embodiment of the invention which complies with the industry standard QSFP (Quad Small Form-Factor Pluggable) 28 will be described below.

[Block Diagram]

Figure 1:
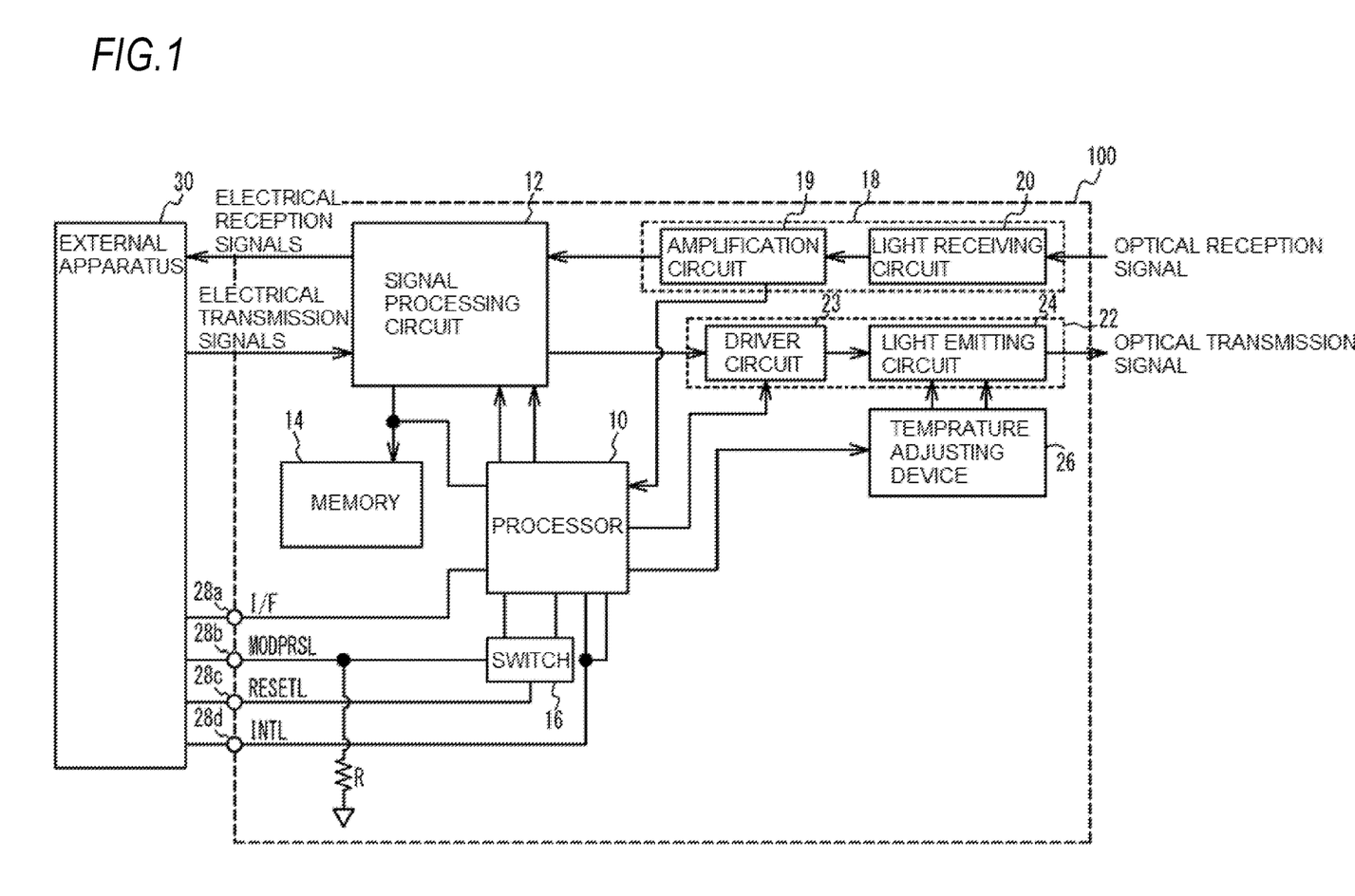
FIG. 1 is a block diagram showing the configuration of an optical transceiver according to an embodiment of the present invention.

FIG. 1 is a block diagram showing the configuration of the optical transceiver 100 according to the embodiment. As shown in FIG. 1, the optical transceiver 100 according to the embodiment is equipped with a processor (controller) 10, a signal processing circuit (signal processing IC) 12, a memory (dedicated memory) 14, a switch 16, an optical reception circuit 18, an optical transmission circuit 22, and a temperature adjusting device 26.

The processor 10 is a control unit such as a CPU (central processing unit) or a microcomputer that runs software (firmware) stored in an internal memory in advance, and controls, for example, the signal processing circuit 12, the optical reception circuit 18, and the optical transmission circuit 22.

The signal processing circuit 12, which is a CDR (clock data recovery) circuit, for example, processes electrical reception signals of plural lanes (channels) that are output from the optical reception circuit 18 and outputs resulting electrical reception signals to an external apparatus (host apparatus) 30. Furthermore, the signal processing circuit 12 processes electrical transmission signals of plural lanes transmitted from the external apparatus 30 and outputs resulting electrical transmission signals to the optical transmission circuit 22. Examples of processing to be performed on electrical reception signals and electrical transmission signals are waveform shaping and timing reproduction. The signal processing circuit 12 may be, for example, a signal processing IC that generates one PAM4 (4-level pulse amplitude modulation) signal from two binary signals and generates, at the same time, two binary signals from one PAM4 signal.

Having an internal memory, the signal processing circuit 12 performs prescribed signal processing according to dedicated programs stored in this memory. The signal processing circuit 12 may be a logic device such as a CPLD (complex programmable logic device) or an FPGA (field programmable gate array), in which case the dedicated programs correspond to circuit information that describes the configuration of an internal logic circuit. The dedicated programs may include setting values of parameters necessary for signal processing and data such as look-up tables.

The memory (dedicated memory) 14, which is a nonvolatile memory such as an EEPROM (electrically erasable programmable read-only memory), stores the dedicated programs for the signal processing circuit 12. The signal processing circuit 12 acquires the dedicated programs from the memory 14 when, for example, it is powered on and stores them in its internal memory. The memory 14 may also be stored with data and programs for the processor 10 and/or data for the signal processing circuit 12. The memory 14 can store the information of the dedicated programs semipermanently even without supply of power.

Where the optical transceiver 100 is a hot-pluggable optical transceiver, it is electrically connected to the apparatus 30 by being inserted into the apparatus 30. Upon insertion of the optical transceiver 100 into the apparatus 30, the optical transceiver 100 is connected to a power source and thereby activated. That is, the optical transceiver 100 is powered on by inserting it into the apparatus 30.

The switch 16 switches the terminal to which a terminal 28c is to be connected electrically between terminals of the processor 10 according to a signal level of a terminal 28b. The switch 16 is an analog switch, for example (described later in detail).

The optical reception circuit 18 is equipped with a light receiving circuit 20 and an amplification circuit 19. The light receiving circuit 20, which is a ROSA (receiver optical subassembly), for example, divides a wavelength-division multiplexed signal received from a lightguide such as an optical fiber into optical reception signals of plural lanes and converts them into current signals. The amplification circuit 19, which is a TIA (transimpedance amplifier), for example, converts the current signals (photocurrents) that are output from the light receiving circuit 20 into voltage signals (electrical reception signals) and outputs them to the signal processing circuit 12.

The processor 10 receives a LOS (loss of signal) signal from the amplification circuit 19, for example. The LOS signal is a signal indicating that the signal levels of electrical reception signals of the respective lanes are lower than a prescribed value. For example, the processor 10 may adjust bias voltages of photodetecting elements in the light receiving circuit 20.

The optical transmission circuit 22 is equipped with a driver circuit 23 and a light emitting circuit 24. The driver circuit 23, which is an LDD (laser diode driver), for example, generates a drive signal for driving a light emitting element by amplifying an electrical transmission signal processed by the signal processing circuit 12. Where plural electrical transmission signals exist, the driver circuit 23 generates plural driver signals corresponding to the respective electrical transmission signals. For example, the processor 10 supplies the driver circuit 23 with disable signals for stopping operation on a lane-by-lane basis. The light emitting circuit 24, which is a TOSA (transmitter optical subassembly), for example, generates plural optical transmission signals on the basis of the plural drive signals, multiplexing the generated plural optical transmission signals, and outputs a resulting multiplexed optical transmission signal to a lightguide (not shown) such as an optical fiber. The multiplexed plural optical signals become a wavelength-division multiplexed (WDM) signal.

The temperature adjusting device 26, which is a TEC (thermoelectric cooler), for example, adjusts the temperature of light emitting elements (not shown) provided in the light emitting circuit 24. For example, the processor 10 adjusts the temperatures of the light emitting elements to a desired temperature by controlling the temperature adjusting device 26. Since the oscillation wavelength (peak wavelength) of each light emitting element varies depending on its operating temperature, the wavelength of an optical signal of each lane can be stabilized at a prescribed value by the temperature adjustment. Where, for example, the interval between wavelength grids of the respective lanes is wider than a range of wavelength variation due to a temperature variation of the light emitting element, the temperature adjustment of the light emitting elements may be omitted.

Terminals 28a-28d are terminals for electrical connection between the processor 10 and the apparatus 30. The terminals 28a-28d are a monitoring control interface (I/F) terminal, a MODPRSL terminal that complies with the QSFP28 standard, a RESETL terminal, and an INTL terminal, respectively.

[Example Terminals of QSFP Optical Transceiver]

Figure 2:
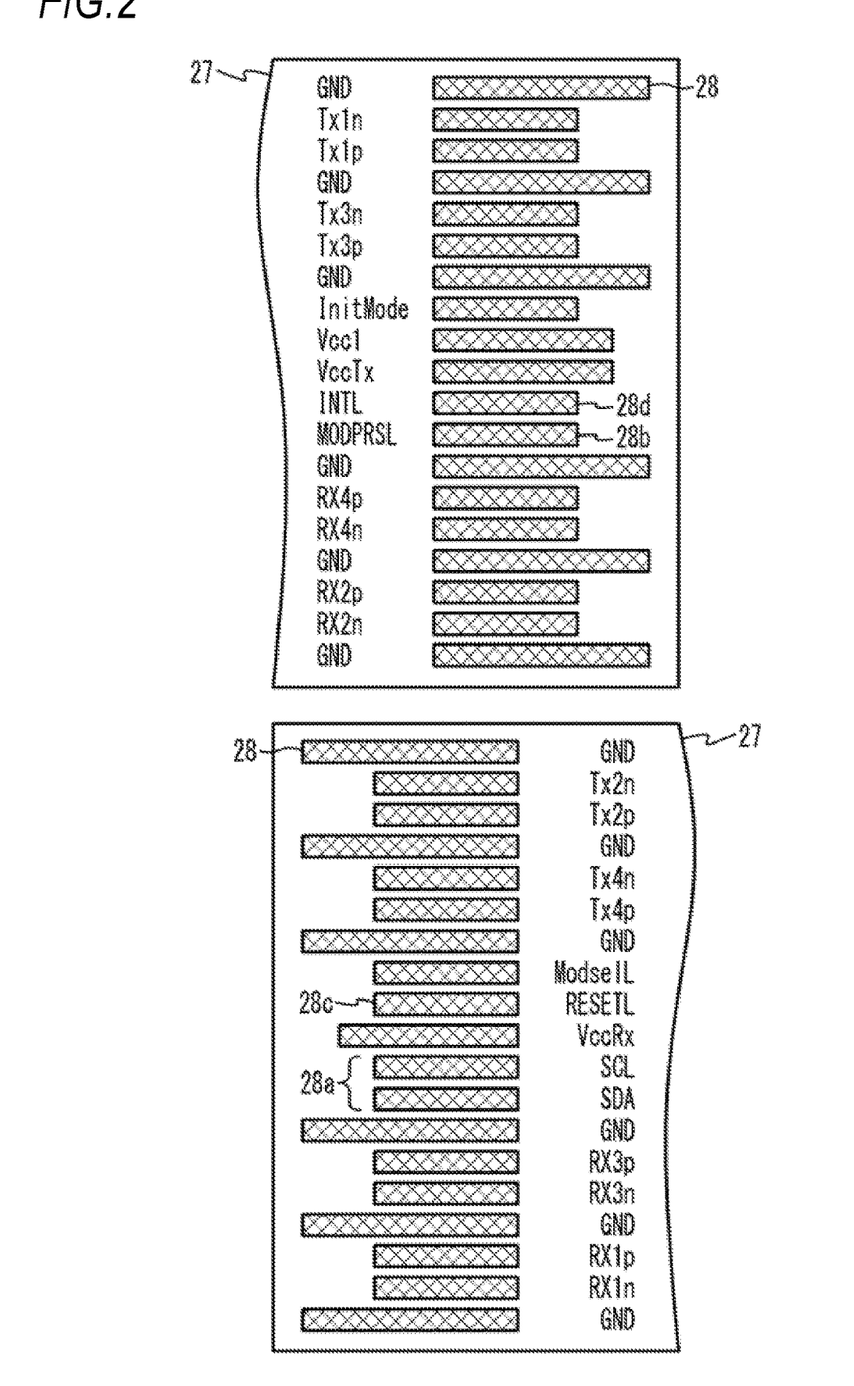
FIG. 2 shows a terminal arrangement employed in the embodiment.

Example terminals that comply with the QSFP28 standard will be described. FIG. 2 shows a terminal arrangement employed in the embodiment. The top part and the bottom part of FIG. 2 shows terminal arrangements on a front surface and a back surface of a circuit board 27 which is included in the optical transceiver 100 and is to be connected to the apparatus 30. For example, the processor 10, the signal processing circuit 12, the memory 14, the switch 16, etc. are mounted on the circuit board 27. As shown in FIG. 2, terminals 28 are provided on the front surface and the back surface of the circuit board 27. Symbols shown beside the respective terminals 28 are their names. Terminals given a symbol "GND" are terminals to be connected to the ground. Terminals given symbols that begin with "Vcc" are terminals to be supplied with a power source voltage. Terminals given symbols that begin with "RX" are terminals for outputting an electrical reception signal. Terminals given symbols that begin with "TX" are terminals for receiving an electrical transmission signal.

An electrical plug is formed by the terminal arrangement shown in FIG. 2. The electrical plug is exposed from the body of the optical transceiver 100 to its outside. When the optical transceiver 100 is inserted into the apparatus 30, an electrical connector in the apparatus 30 and the electrical plug shown in FIG. 2 are fitted into/with each other, whereby the optical transceiver 100 and the apparatus 30 are connected to each other electrically. Since patterns of the terminals GND are longer than those of the other terminals, the terminals GND are electrically connected to the ground of the apparatus 30 earlier than the other terminals when the optical transceiver 100 is inserted into the apparatus 30.

Terminals SCL and SDA are terminals 28a for an I2C (inter-integrated circuit) serial bus corresponding to a monitoring control I/F and correspond to a clock line and a data line, respectively. Although in FIG. 1 the I2C serial bus terminals 28a are shown in a simplified manner as a single terminal, in actuality they consist of one SCL terminal and one SDA terminal. According to the QSFP28 standard, a maximum clock frequency of the monitoring control I/F is 400 kHz. Terminals MODPRSL, RESETL, and INTL correspond to the terminals 28b, 28c, and 28d, respectively.

[Connections Between Processor 10 and Neighboring Units]

Figure 3:
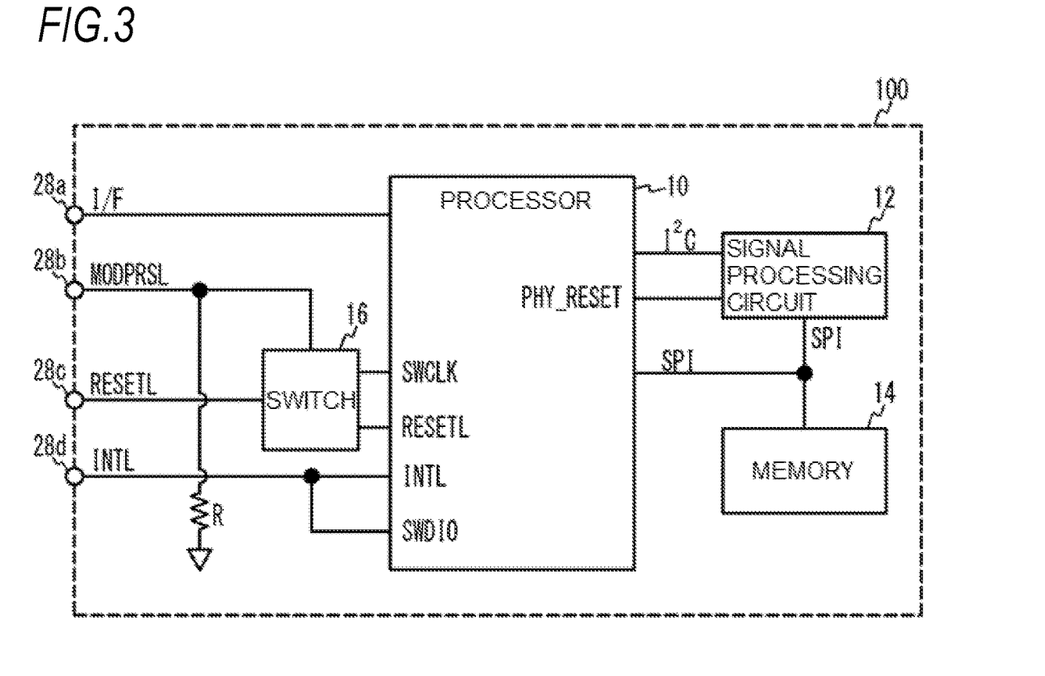
FIG. 3 is a block diagram showing how a processor and neighboring units are connected to each other in the optical transceiver according to the embodiment.

FIG. 3 is a block diagram showing how the processor 10 and neighboring units are connected to each other in the embodiment. As shown in FIG. 3, the clock terminal and the data terminal of the terminals 28a are electrically connected to the processor 10. The terminal 28b is grounded via a resistance element R whose resistance is set at several tens to several hundreds of ohms, for example. Furthermore, the terminal 28b is electrically connected to a control line of the switch 16. The switch 16 connects the terminal 28c to an SWCLK terminal or a RESETL terminal of the processor 10 according to a signal level of the terminal 28b. For example, the terminal 28c is electrically connected to the SWCLK terminal when the voltage value at the terminal 28b corresponds to the high level (or low level) and to the RESETL terminal when the voltage value at the terminal 28b corresponds to the low level (or high level). The terminal 28d is electrically connected to an INTL terminal and an SWDIO terminal of the processor 10.

For example, the processor 10 is a processor incorporating a CPU core that is configured according to an ARM architecture. The processor 10 is reset when the voltage value of the RESETL terminal is turned to the low level by an external signal. The processor 10 changes the voltage value of the INTL terminal to the low level, that is, causes the INTL terminal to output an INIL signal that is set at the low level, when a preset alarm has occurred. Terminals SWCLK and SWDIO are terminals to which a data transmission/reception serial communication bus is to be connected, and correspond to a clock terminal and a data terminal, respectively. A maximum clock frequency is 10 MHz, for example.

The processor 10 is electrically connected to the signal processing circuit 12 by an I2C serial communication bus. The processor 10 controls the signal processing circuit 12 by sending and receiving serial data to and from the signal processing circuit 12 through the I2C bus. A PHY_RESET terminal of the processor 10 is connected to the signal processing circuit 12. By making its PHY_RESET terminal active, the processor 10 renders the signal processing circuit 12 in a reset state and then re-activates the signal processing circuit 12. The signal processing circuit 12 and the memory 14 are electrically connected to each other by an SPI (Serial Peripheral Interface) communication bus. The signal processing circuit 12 acquires dedicated programs from the memory 14 through the SPI bus. The processor 10 and the memory 14 are electrically connected to each other by an SPI bus without intervention of the signal processing circuit 12. The processor 10 stores dedicated programs in the memory 14 through the SPI bus without intervention of the signal processing circuit 12. Although the I2C and SPI serial communication schemes are employed as described above, the serial communication schemes are not restricted to I2C and SPI and other schemes may be employed.

[Connection to External Apparatus 30]

Figure 4:
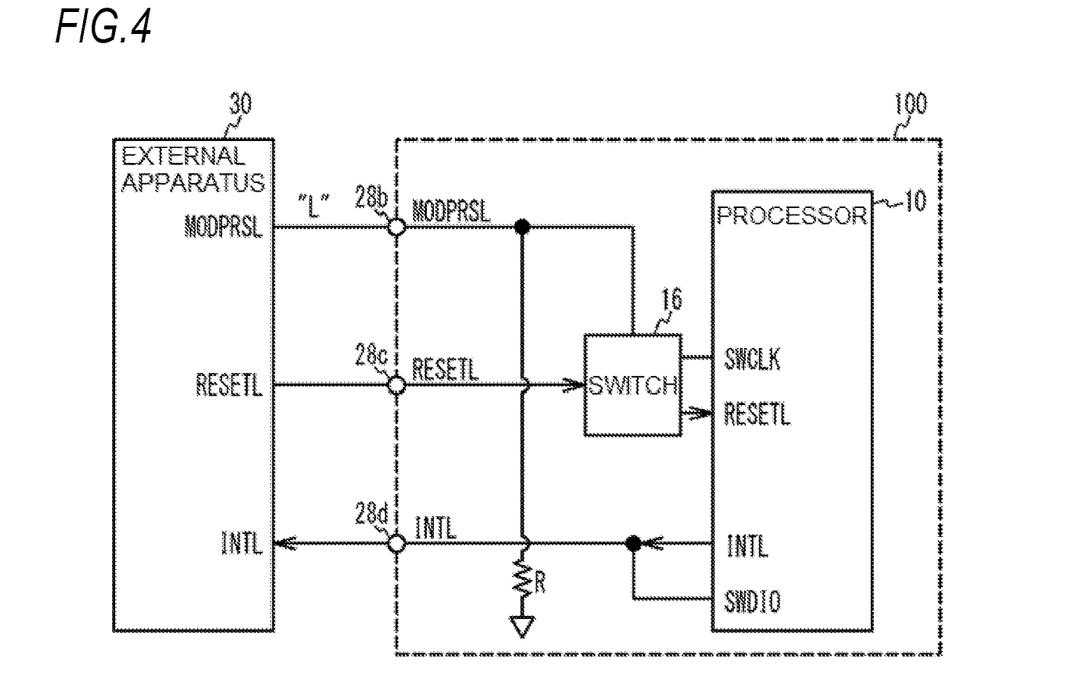
FIG. 4 is a block diagram showing how terminals are connected when the optical transceiver is connected to a host apparatus.

A description will be made of how the terminals 28b to 28d are connected when the optical transceiver 100 is inserted into and electrically connected to the external apparatus 30. FIG. 4 is a block diagram showing how the terminals 28b to 28d are connected when the optical transceiver 100 is connected to the apparatus 30 in the embodiment. As shown in FIG. 4, the terminals 28b to 28d are connected to a MODPRSL terminal, a RESETL terminal, and an INTL terminal of the apparatus 30, respectively.

The impedance at the MODPRSL terminal of the apparatus 30 is set higher than the resistance value of the resistance element R. As a result, when the terminal 28b is electrically connected to the MODPRSL terminal of the apparatus 30, the voltage value of the terminal 28L is pulled down (electrically connected) to the low level L by the resistance element R, whereby the apparatus 30 can detect that the optical transceiver 100 has been attached to it.

When the voltage value of the terminal 28L has become the low level L, the switch 16 connects the terminal 28c to the RESETL terminal of the processor 10. As a result, the processor 10 is reset when the apparatus 30 sets the voltage value of the RESETL terminal at the low level. When detecting a prescribed alarm, the processor 10 sets the voltage value of the INTL terminal at the low level. Thus, the apparatus 30 can detect an alarm issued by the optical transceiver 100. The INTL terminal is also connected to the SWDIO terminal of the processor 10. However, since no clock signal is input to the SWCLK terminal, even when the voltage value of the INTL terminal becomes the low level, the processor 10 does not recognize it as a particular instruction or data and hence no problem arises. Thus, with the configuration of the optical transceiver 100 shown in FIG. 3, each of the MODPRSL terminal, the RESETL terminal, and the INTL terminal can function in the same manners as prescribed in the QSFP28 standard.

[Connection to Writing Apparatus 32]

To rewrite (upgrade) the dedicated programs for the signal processing circuit 12 stored in the memory 14, the optical transceiver 100 is connected to a writing apparatus 32. Like the apparatus 30, the writing apparatus 32 has a mechanism (e.g., cage) into which the optical transceiver 100 can be inserted. When the optical transceiver 100 is inserted into the writing apparatus 32, they are electrically connected to each other.

Figure 5:
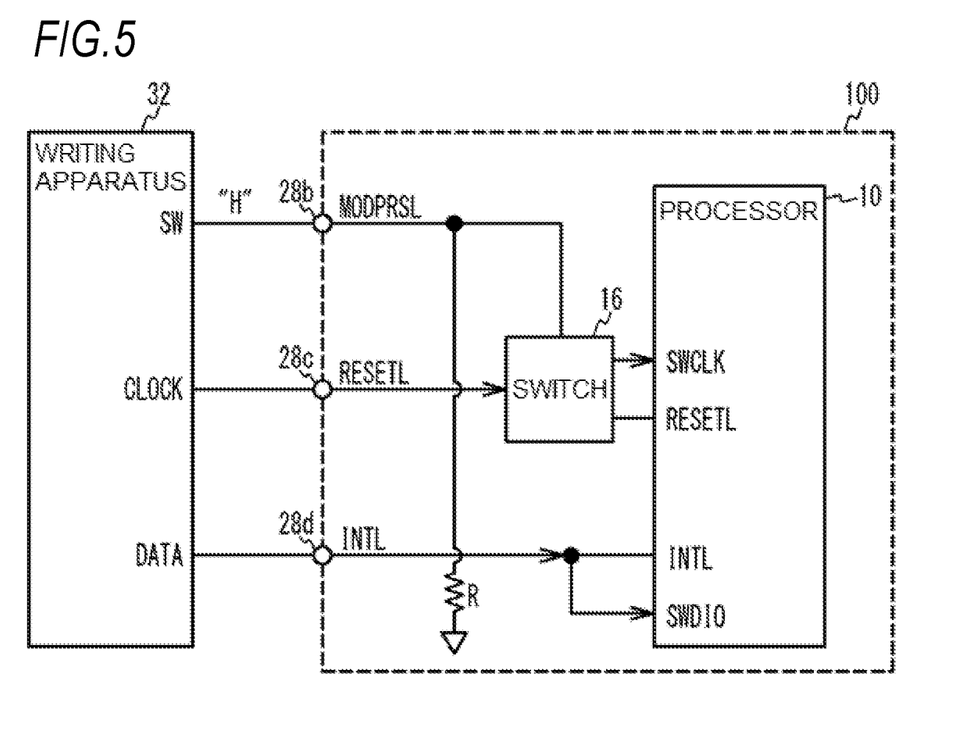
FIG. 5 is a block diagram showing how the terminals are connected when the optical transceiver is connected to a writing apparatus.

How the terminals 28b to 28d are connected when the optical transceiver 100 is connected to the writing apparatus 32 will be described below. FIG. 5 is a block diagram showing how the terminals 28b to 28d are connected when the optical transceiver 100 is connected to the writing apparatus 32 in the embodiment. As shown in FIG. 5, the terminals 28b to 28d are electrically connected to an SW terminal, a CLOCK terminal, and a DATA terminal of the writing apparatus 32, respectively.

When the writing apparatus 32 writes dedicated programs for the signal processing circuit 12, the writing apparatus 32 sets the voltage value of the SW terminal to a value corresponding to the high level H. As a result, the voltage value of the terminal 28b is changed to the high level. For the sake of convenience, this will be expressed as "the writing apparatus 32 gives the high level H to the SW terminal." Since the control line of the switch 16 receives the high level H from the SW terminal via the terminal 28b, the switch 16 changes its internal connections so that the terminal 28c is electrically connected to the SWCLK terminal of the processor 10. When the writing apparatus 32 outputs a clock signal from its CLOCK terminal, the clock signal is input to the SWCLK terminal of the processor 10. When the writing apparatus 32 outputs data from its DATA terminal in synchronism with the clock signal according a prescribed protocol, the data are input to the SWDIO terminal of the processor 10. In this manner, with the configuration of the optical transceiver 100 shown in FIG. 3, the terminals 28b to 28d can be used for writing of dedicated programs, that is, can function differently than in manners prescribed in the QSFP28 standard.

[Sequence Diagram]

Figure 6:
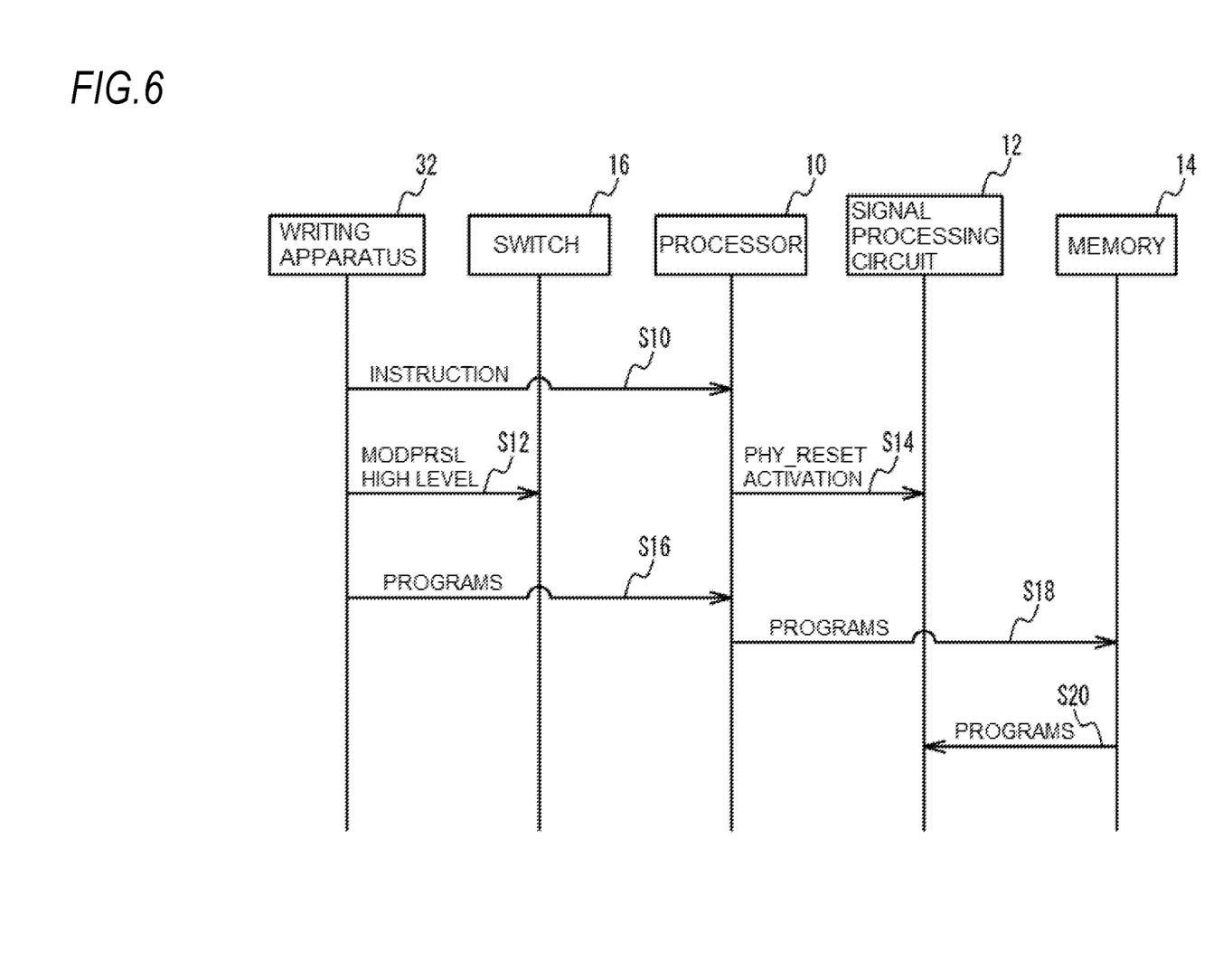
FIG. 6 is a sequence diagram of a process that the writing apparatus writes dedicated programs to a dedicated memory in the embodiment.

Next, a description will be made of a process that is executed when the writing apparatus 32 writes dedicated programs for the signal processing circuit 12. FIG. 6 is a sequence diagram of this process in the embodiment in which time elapses downward. In FIG. 6, arrows mean commands or data streams from a master device to a slave device. As shown in FIG. 6, at step S10, the writing apparatus 32 (as a master device) instructs the processor 10 (as a slave device) to start a process of writing of dedicated programs. At step S12, the writing apparatus 32 sets the voltage value of the MODPRSL terminal at the high level. In response, the switch 16 electrically connects the CLOCK terminal of the writing apparatus 32 to the SWCLK terminal of the processor 10. At step S14, the processor 10 activates its PHY_RESET terminal, whereby the signal processing circuit 12 is reset so as not to influence the SPI bus. That is, although the signal processing circuit 12 is electrically connected to the SPI bus, a state is established that the signal processing circuit 12 does not respond to it even if the processor 10 transmits serial data to the SPI bus (i.e., the serial communication function is suspended).

At step S16, the optical transmission circuit 22 transmits dedicated programs for the signal processing circuit 12 to the processor 10 via the terminals 28c and 28d. At step S18, the processor 10 holds the received dedicated programs for the signal processing circuit 12 temporarily in the internal memory of the processor 10 and then stores the dedicated programs in the memory 14 through the SPI bus. After completion of the storage of the dedicated programs in the memory 14, the optical transceiver 100 is removed from the writing apparatus 32.

When the optical transceiver 100 for which the upgrading of the dedicated programs has been completed is inserted into the apparatus 30, the optical transceiver 100 is powered on and the signal processing circuit 12 reads the upgraded dedicated programs from the memory 14 through the SPI bus.

[Data in Processor 10 and Memory 14]

Figure 7:
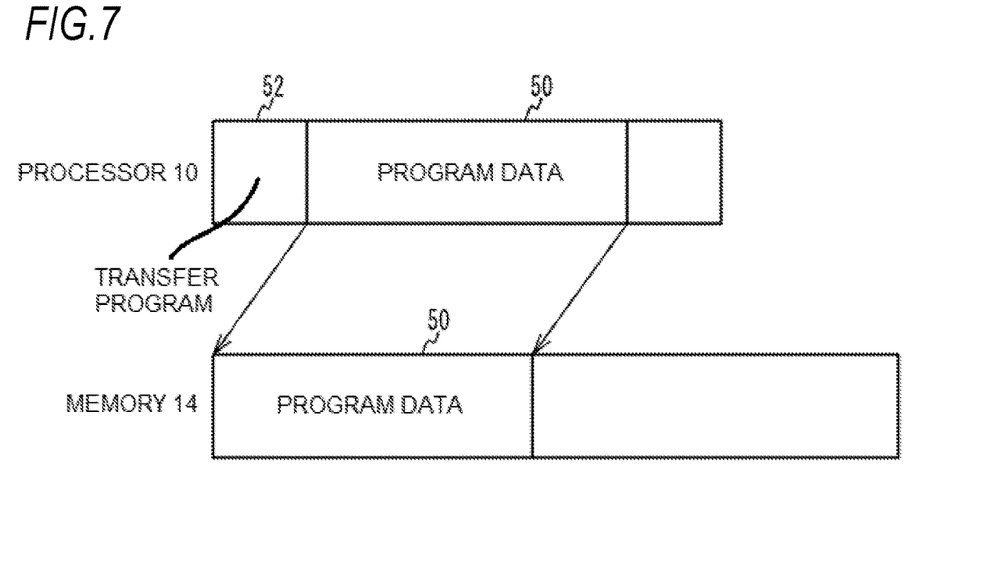
FIG. 7 is a diagram showing memory areas of an internal memory of a processor and the dedicated memory in the embodiment.
Figure 8:
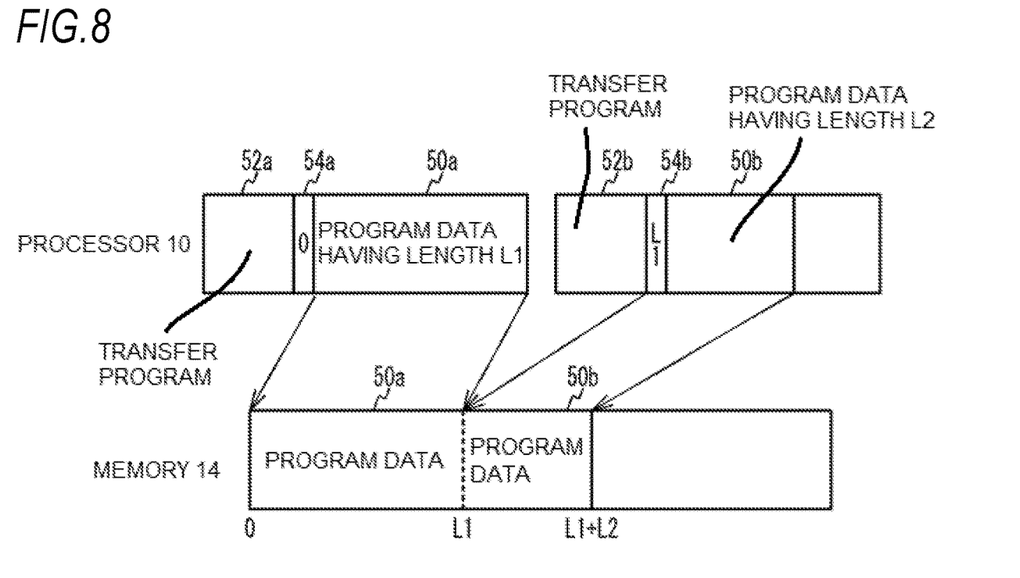
FIG. 8 is another diagram showing memory areas of the internal memory of the processor and the dedicated memory in the embodiment.

FIGS. 7 and 8 are diagrams each showing information stored in memory areas of the internal memory of the processor 10 and the dedicated memory 14 in the embodiment.

As shown in FIG. 7, a transfer program 52 and program data 50 including the dedicated programs for the signal processing circuit 12 are written by the writing apparatus 32 and stored in the internal memory of the processor 10. The transfer program 52 is a program for transferring the program data 50 to the memory 14. By running the transfer program 52, the processor 10 writes the program data 50 stored in the internal memory to the memory 14.

As shown in FIG. 8, where the total size of the transfer program 52 and the program data 50 is larger than the capacity of the internal memory of the processor 10, the writing apparatus 32 divides the program data 50 and transmits divisional program data to the processor 10.

The writing apparatus 32 transmits a transfer program 52a, start position data 54a, and program data 50a having a length L1 to the processor 10. The start position data 54a indicates a start position (start address) of writing of the program data 50a to the memory 14 and is "0," for example. The processor 10 writes the program data 50a to the memory 14 according to the transfer program 52a using address "0" of the memory 14 as a start position.

Then the writing apparatus 32 transmits a transfer program 52b, start position data 54b, and program data 50b having a length L2 to the processor 10. Where the transfer program 52b is the same as the transfer program 52a, transmission of the transfer program 52b to the processor 10 may be omitted. In this case, the start position data 54b and the program data 50b are transmitted after the transfer program 52a. The start position data (start address) 54b is "L1," for example. The processor 10 writes the program data 50b to the memory 14 according to the transfer program 52b (or transfer program 52a) using address "L1" of the memory 14 as a start position. In this case, the program data 50a are stored in a memory area having addresses "0" to "L1−1."

As described above, the program data 50 can be written to the memory 14 in such a manner as to be divided into the program data 50a and the program data 50b. As mentioned above, where the transfer program 52a can be used in place of the transfer program 52b, it is not necessary to write the transfer program 52b to the memory 14.

[Comparative Examples]

Figure 9:
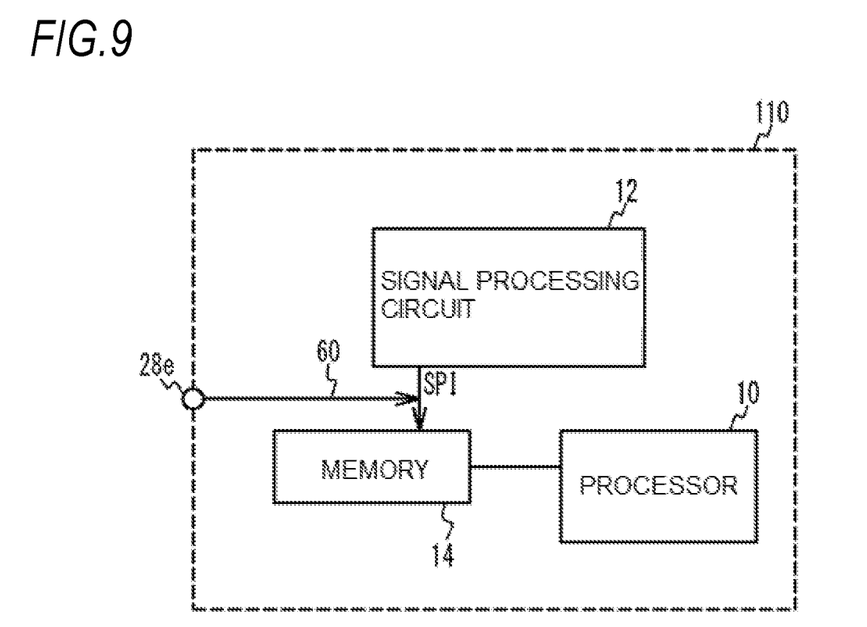
FIG. 9 is a block diagram of part of an optical transceiver of Comparative Example 1.

Comparative Examples will be described below for description of advantages of the embodiment. FIG. 9 is a block diagram of part of an optical transceiver 110 of Comparative Example 1. As shown in FIG. 9, it is desired to provide a signal processing circuit 12 in the optical transceiver 110. Dedicated programs for the signal processing circuit 12 are stored in a memory 14. When the signal processing circuit 12 is powered on, the signal processing circuit 12 acquires the dedicated programs from the memory 14. Upgrading of the dedicated programs is performed by, for example, writing upgraded dedicated programs to the memory 14 in a memory area where the current dedicated programs are stored (overwriting).

The optical transceiver 110 of Comparative Example 1 is provided with a terminal 28e. As indicated by an arrow 60, the writing apparatus 32 writes the upgraded dedicated programs to the memory 14 via the terminal 28e.

However, the number of terminals of an optical transceiver is determined by a standard such as QSFP. For example, as shown in FIG. 2, the number of terminals 28 are prescribed in the QSFP28 standard. It is therefore not allowable to provide the new terminal 28e. Furthermore, adding the terminal 28e for upgrading of dedicated programs to an optical transceiver standard is not preferable because it is an obstruction to miniaturization of an optical transceiver and the frequency of upgrading of the dedicated programs is low.

Figure 10:
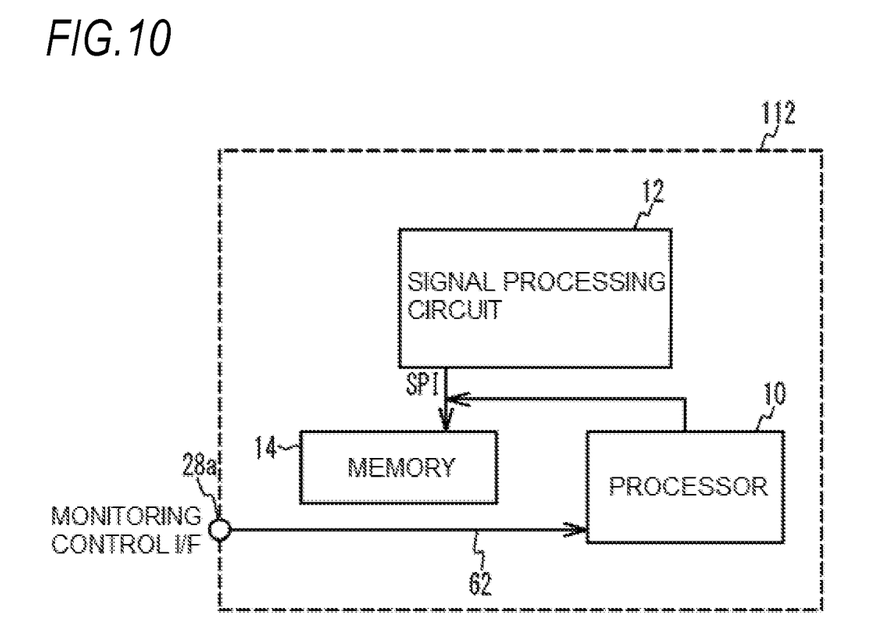
FIG. 10 is a block diagram of part of an optical transceiver of Comparative Example 2.

FIG. 10 is a block diagram of part of an optical transceiver 112 of Comparative Example 2. In the optical transceiver 112 of Comparative Example 2, as indicated by an arrow 62 in FIG. 10, the writing apparatus 32 transmits programs to a processor 10 via a monitoring control I/F terminal 28a and the processor 10 writes the programs to a memory 14. This makes it possible to write dedicated programs for a signal processing circuit 12 without increasing the number of terminals of the optical transceiver 112.

However, a maximum clock frequency of the monitoring control I/F is as low as 400 kHz in the case of the I2C serial communication scheme, for example. Thus, transmission of programs takes long time. For example, in a case that the size of dedicated programs for a signal processing circuit 12 is 128 kbytes and the size of program data transmitted each time (see FIG. 8) is 256 bytes, the transmission of the dedicated programs from the writing apparatus 32 to a processor 10 takes about 30 sec and the transmission of the dedicated programs from the processor 10 to a memory 14 takes about 30 sec. Thus, a total time of about 60 sec is taken to write the dedicated programs.

[Advantages of Embodiment]

On the other hand, in the optical transceiver 100, a maximum clock frequency of, for example, the SWD (Serial Wire Debug) serial communication scheme is 10 MHz. Thus, dedicated programs can be transmitted from the writing apparatus 32 to the processor 10 in about 2 sec. Thus, even if the time taken to transmit the dedicated programs from the processor 10 to the memory remains about 30 sec, a total time taken to write the dedicated programs is about 32 sec, which is shorter than in Comparative Example 2.

In optical transceiver 100 according to the embodiment which can be hot-plugged and unplugged into and from the apparatus 30, the optical reception circuit 18 converts optical reception signals (optical signals) received from the outside into electrical reception signals (electrical signals) and outputs the latter to the apparatus 30. The optical transmission circuit 22 converts electrical transmission signals (electrical signals) received from the apparatus 30 into optical transmission signals (optical signals) and transmits the latter to the outside. The signal processing circuit 12 reads the dedicated programs when powered on and processes, according to the dedicated programs, electrical transmission signals received from the apparatus 30 and electrical reception signals to be output to the apparatus 30. The memory 14 (dedicated memory) continues to store the dedicated programs even in a state that it is not supplied with power. The processor 10 (controller) controls the optical transmission circuit 22, the optical reception circuit 18, and the signal processing circuit 12. The terminal 28c (reset terminal) is a terminal that allows the processor 10 to receive a reset signal from the apparatus 30. The terminal 28d (alarm terminal) is a terminal that allows the processor 10 to transmit an alarm signal to the apparatus 30. The terminal 28b (insertion detection terminal) is a terminal that allows the apparatus 30 to detect insertion of the optical transceiver 100 into the apparatus 30.

In the thus-configured optical transceiver 100, when the voltage value of the terminal 28b is lower than a prescribed value (e.g., when it is at the low level), the processor 10 is rendered in a state that it can receive a reset signal from the apparatus 30. When the voltage value of the terminal 28b is higher than the prescribed value (e.g., when it is at the high level), the processor 10 receives dedicated programs from the writing apparatus 32 by receiving a clock signal via the terminal 28c via the terminal 28c and receiving a data signal via the terminal 28d in synchronism with the clock signal and stores the dedicated programs received from the apparatus 30 in the memory 14. In this manner, the use of the terminal 28b makes it possible to use the terminal 28c for the purposes of resetting the processor 10 and writing of the dedicated programs from the apparatus 30. Thus, the dedicated programs for the signal processing circuit 12 can be transmitted from the writing apparatus 32 to the processor 10. As a result, the dedicated programs for the signal processing circuit 12 can be written to the memory 16 at high speed.

The switch 16 is electrically connected to the terminals 28b and 28c. The terminal 28c is electrically connected to the RESETL terminal (reset terminal) of the processor 10 when the voltage value of the terminal 28b is lower than a prescribed value, and is electrically connected to the SWCLK terminal (clock input terminal) for receiving a clock signal for the processor 10 when the voltage value of the terminal 28b is higher than the prescribed value. The terminal 28b is pulled down (electrically connected) to the ground of the optical transceiver 100 by the resistance element R. By using the terminal 28b in this manner, the terminal 28c is used for resetting the processor 10 when the optical transceiver 100 is inserted into the apparatus 30 and is used for writing dedicated programs when the optical transceiver 100 is inserted into the writing apparatus 32.

The terminals 28c, 28d, and 28b are the RESETL terminal, the INTL terminal, and the MODPRSL terminal that comply with the QSFP28 standard, respectively. With this measure, programs can be transmitted from the writing apparatus 32 to the processor 10 using the RESETL terminal, the INTL terminal, and the MODPRSL terminal. The last character "L" of the names of the terminals 28c, 28d, and 28b indicates that the related signal turns active when the voltage value of each of these terminals becomes the low level. Thus, stated in general terms, the terminals 28c, 28d, and 28b are a RESET terminal, an INT terminal, and a MODPRS terminal, respectively. When the optical transceiver 100 is inserted into the apparatus 30 and caused to operate in an ordinary state, the RESETL terminal, the INTL terminal, and the MODPRSL terminal function according to the QSFP28 standard.

The processor 10 stores dedicated programs in the dedicated memory 14 by suspending the serial communication function of the signal processing circuit 12. In this manner, the processor 10 writes the dedicated programs to the memory 14 without causing any influence on the signal processing circuit 12. With this measure, dedicated programs can be stored from the internal memory of the processor 10 to the memory 14 efficiently.

The embodiment disclosed above is just an example in every aspect and should not be construed in a restrictive manner. The scope of the invention should be indicated by the claims rather than the embodiment. Various modifications can be made in every aspect without departing from the spirit and scope of the claims and their equivalents.

What is claimed is:

1. A hot-pluggable optical transceiver capable of being inserted into an apparatus, the hot-pluggable optical transceiver comprising:
    an optical reception circuit configured to convert an optical incoming signal to an electrical incoming signal for receiving;
    an optical transmission circuit configured to convert an electrical outgoing signal to an optical outgoing signal for transmitting;
    a signal processing circuit configured to load software when the signal processing circuit is activated by powering up the optical transceiver, and to process the electrical incoming signal and the electrical outgoing signal according to the software;
    a nonvolatile memory storing the software;
    a control unit controlling at least one of the optical reception circuit, the optical transmission circuit, and the signal processing circuit;
    an insertion detection terminal allowing the apparatus to detect that the hot-pluggable optical transceiver is inserted in the apparatus;
    a reset terminal for receiving a reset signal from the apparatus; and
    an alarm terminal for sending an alarm signal to the apparatus, wherein:
    the control unit is allowed to receive the reset signal from the apparatus through the reset terminal when the insertion detection terminal has a voltage that is smaller than a predetermined value; and
    the control unit is allowed to load new software by receiving a clock signal from the apparatus through the reset terminal and receiving a data signal synchronized with the clock signal from the apparatus through the alarm terminal and to store the new software in the nonvolatile memory when the insertion detection terminal has a voltage that is larger than the predetermined value.

2. The hot-pluggable optical transceiver according to claim 1, further comprising a switch which is electrically connected to the insertion detection terminal and the reset terminal, and which electrically connects the reset terminal to a reset terminal of the control unit when the insertion detection terminal has a voltage that is lower than the predetermined value and electrically connects the reset terminal to a clock input terminal for receiving the clock signal of the control unit when the insertion detection terminal has a voltage that is higher than the predetermined value, wherein:
    the insertion detection terminal is pulled down to a ground of the hot-pluggable optical transceiver by a resistance element.

3. The hot-pluggable optical transceiver according to claim 1, wherein the reset terminal, the alarm terminal, and the insertion detection terminal are a RESET terminal, an INT terminal, and a MODPRS terminal that comply with the QSFP28 standard.

4. The hot-pluggable optical transceiver according to claim 1, wherein the control unit stores the new software in the nonvolatile memory by suspending a serial communication function of the signal processing circuit.

* * * * *